Jan. 31, 1956    J. RABINOW    2,732,921
SELF-EXCITED MAGNETIC CLUTCH
Filed Oct. 3, 1949    2 Sheets-Sheet 1
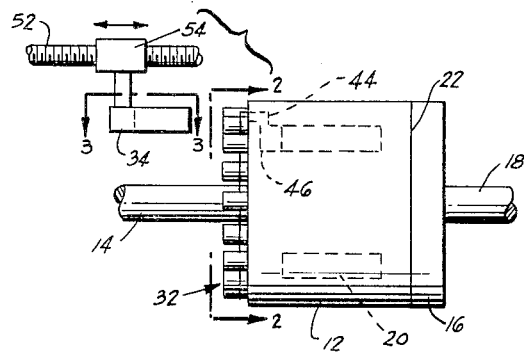
Fig. 1.
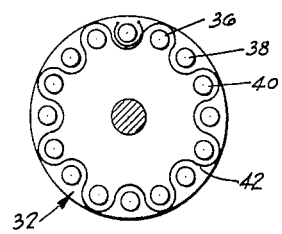
Fig. 2.
Fig. 3.
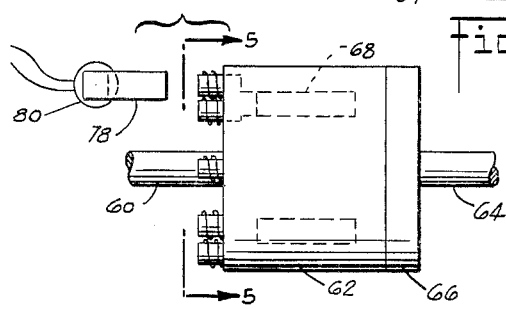
Fig. 4.
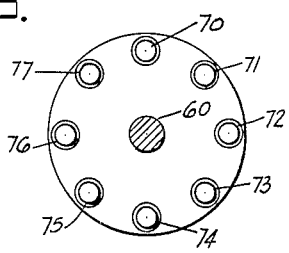
Fig. 5.
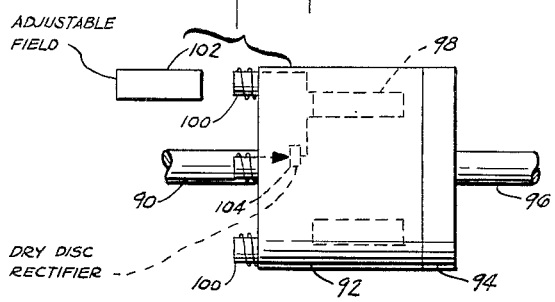
Fig. 7.
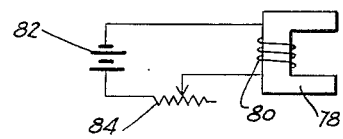
Fig. 6.
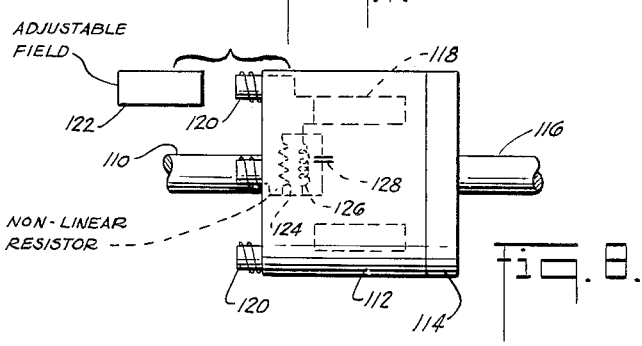
Fig. 8.
INVENTOR.
JACOB RABINOW
BY
James and Franklin
ATTORNEYS Jan. 31, 1956 J. RABINOW 2,732,921
SELF-EXCITED MAGNETIC CLUTCH
Filed Oct. 3, 1949 2 Sheets-Sheet 2
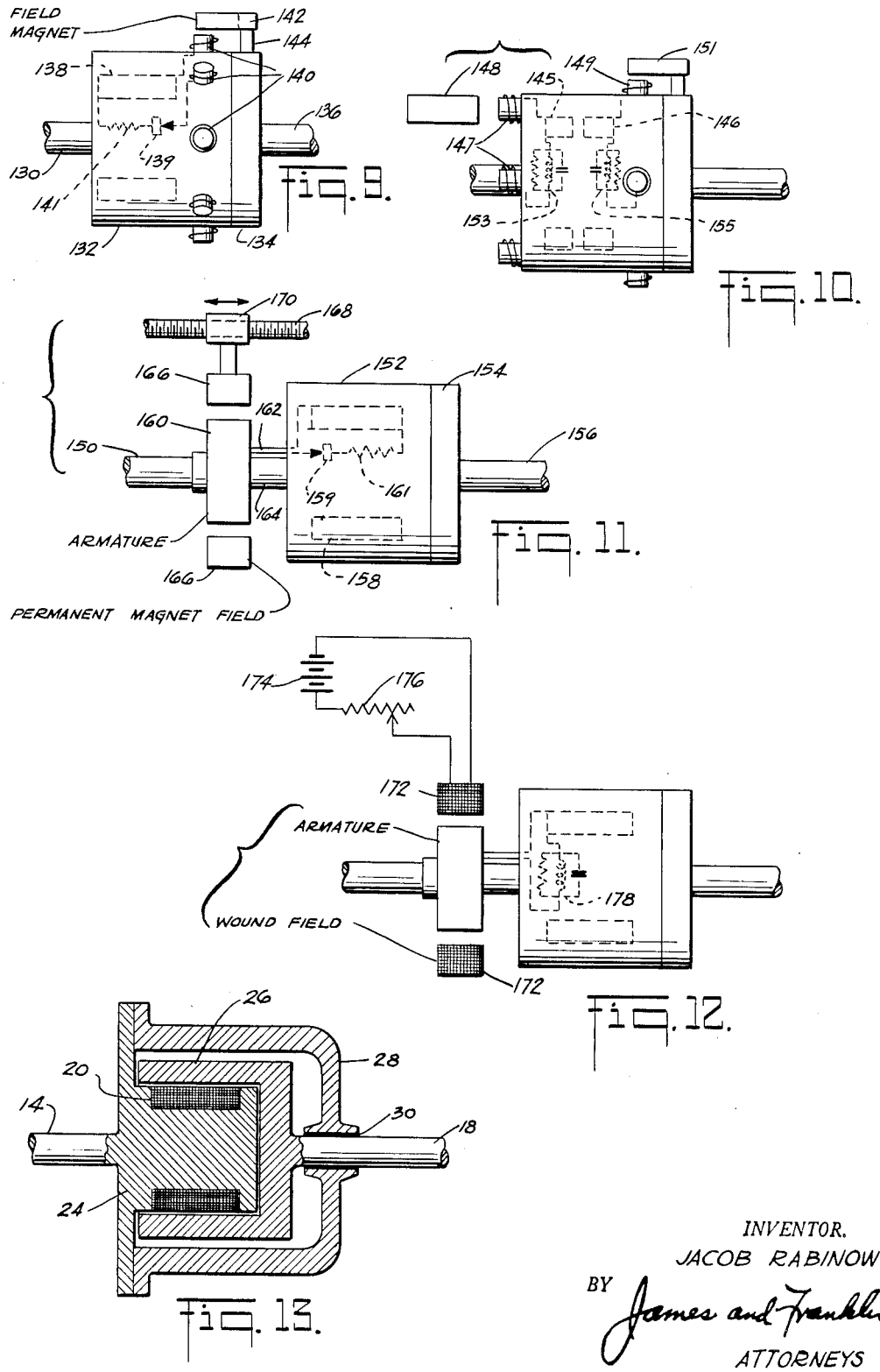
INVENTOR.
JACOB RABINOW
BY James and Franklin
ATTORNEYS ically # United States Patent Office 2,732,921
Patented Jan. 31, 1956

2,732,921

SELF-EXCITED MAGNETIC CLUTCH

Jacob Rabinow, Takoma Park, Md., assignor to Eaton Manufacturing Company, Cleveland, Ohio, a corporation of Ohio Application October 3, 1949, Serial No. 119,247

10 Claims. (Cl. 192—21.5)

This invention relates to magnetic clutches, including friction clutches, eddy current clutches, hysteresis clutches, and more particularly magnetic fluid clutches. The latter clutch is disclosed in my co-pending applications Serial No. 783,426, filed October 31, 1947, now Patent No. 2,575,360 issued November 20, 1951, and Serial No. 51,402, filed September 27, 1948, now Patent No. 2,667,237, issued January 26, 1954.

The primary object of the present invention is to generally improve magnetic clutches, and more particularly to provide such a clutch which is self-excited. In most forms of the present invention this eliminates the need for an external source of electrical power, and even in those forms of the invention where an external source is employed, the source is used only to excite the field of a small generator, and therefore the source may be very small.

Another advantage of the invention is that it eliminates the need for slip rings with their accompanying mechanical and servicing difficulties. Moreover, in aircraft service there are special added difficulties with slip rings at high altitude. Furthermore, the self-excited clutch may be used in an explosive atmosphere in which slip rings would be hazardous. The self-excited clutch also eliminates radio interference, which interference would be serious for some purposes.

Another object of the invention is to provide means for adjusting the effective strength of the magnetic field applied to the armature of the generator by the field magnet. This may be done by varying the spacing between the field magnet and the armature, or, if the field magnet has a field coil, by varying the energization of the field coil.

Still another object of the invention is to provide means for energizing the magnetizing coil of the clutch with direct current when desired. This has the advantage of eliminating the use of laminations for the iron structure of the clutch.

Still another object is to provide means for automatically varying the energization of the magnetizing coil of the clutch as a function of the rotative speed, thereby giving the clutch a special starting characteristic. This may be done by including in the circuit between the armature and the magnetizing coil of the clutch, a resistor having a non-linear temperature and/or current characteristic.

The addition of reactive components in series and/or in parallel with the magnetizing coil will also produce special effects which are discussed later. In general the impedance used may be resistive, inductive, capacitative, or combinations of the same.

Still another object of the invention is to provide means whereby the magnetization may be made a function of the slippage or relative speed of the two parts of the clutch, when desired. This gives the clutch a shock absorption characteristic similar to that of a fluid coupling of the turbine type. This object may be fulfilled by mounting the field magnet of the generator on one part of the clutch, while the armature is mounted on the other, so that the slippage or relative movement of the two parts of the clutch provides the magnetizing current.

To accomplish the foregoing general objects, and other more specific objects which will hereinafter appear, my invention resides in the self-excited magnetic clutch elements, and their relation one to another as are hereinafter more particularly described in the following specification. The specification is accompanied by drawings in which:

Fig. 1 is a schematic elevation of a self-excited magnetic clutch embodying features of my invention;

Fig. 2 is a view taken approximately in the plane of the line 2—2 of Fig. 1;

Fig. 3 is a detail taken approximately in the plane of the line 3—3 of Fig. 1;

Fig. 4 is a schematic elevation of a modification;

Fig. 5 is a section taken approximately in the plane of the line 5—5 of Fig. 4;

Fig. 6 is explanatory of the energization of the field magnet;

Fig. 7 is a schematic elevation of a modified form of the invention utilizing direct current rather than alternating current;

Fig. 8 is a schematic elevation of a modification of the invention in which special torque characteristics are obtained by the use of special non-linear resistive or reactive elements;

Fig. 9 is a schematic elevation of a modification in which the magnetization is a function of the slippage;

Fig. 10 is a schematic elevation of a modification in which the magnetization is obtained from two sources combining the characteristics obtained when using a non-rotating field and when using a rotating field;

Fig. 11 is a schematic elevation of a modification in which the generator is constructed as a unit separate from though rotated by the clutch;

Fig. 12 is a schematic elevation of a similar modification but using a generator having field coils; and Fig. 13 is a longitudinal section explanatory of some features of the magnetic fluid clutch.

Referring to the drawing, and more particularly to Figs. 1, 2 and 3, the magnetic clutch comprises a driving part 12 carried by a driving shaft 14, and a driven part 16 carried by a driven shaft 18. The driving part 12 carries a magnetizing coil 20 for magnetizing the magnetic clutch. The separation between the driving and driven parts of the clutch is schematically represented by the line 22. However, it will be understood that the parts may be shaped and relatively arranged in various ways.

For purposes of example, reference may be made to magnetic fluid clutches, some of which are disclosed in my co-pending application Serial No. 783,426 previously referred to. Fig. 13 shows one form, in which it will be seen that the driving part 24 of the clutch is generally cylindrical and is received within a hollow cylindrical driven part 26. The magnetizing coil 20 is carried by the driving part 24 and is recessed therein as shown. The coil is cylindrical, and coaxial with the shafts. The parts 24 and 26 are made of ferrous metal or paramagnetic material, and run in a magnetic fluid mixture consisting of ferrous or paramagnetic particles or powder in a lubricant, for example light machine oil. Such clutches are described in my co-pending applications Serial No. 783,426 and Serial No. 51,402, now Patent No. 2,667,237 issued January 26, 1954, aforesaid. The magnetic fluid may be confined within a casing 28 having a bearing and seal at 30, and if the said casing is made of ferrous material, the clutch part 26 will be interleaved between clutch parts 24 and 28.

Reverting now to Fig. 1, it may be explained that in this figure, and in all succeeding figures, the clutch body per se has been simplified and is shown schematically as comprising the clutch parts 12 and 16 on shafts 14 and 18, respectively, one of said parts carrying the magnetizing coil 20. This symbolizes the magnetic clutch, regardless of its specific form.

Now, in accordance with the present invention, the driving part 12 of the clutch is provided with an armature generally designated 32, and rotatable relative to a field magnet indicated at 34. In the present case the armature 32 comprises a series of closely spaced magnetic poles 36, 38, 40, etc. (Fig. 2), around which a field conductor 42 is wound in sinuous form as shown, thus making up a so-called "snake winding." A single armature conductor is shown, but it will be understood that the conductor may be wound about the poles repeatedly to form a multiple coil winding. The armature winding is connected to the magnetizing coil 20, as is indicated by the connections 44 and 46 (Fig. 1).

The field magnet 34 is in this case a permanent magnet. It may have a horseshoe shape with poles 48 and 50, as indicated in Fig. 3, the said poles preferably having the same spacing as the poles 36, 38, 40, etc. of the armature.

The magnetization of the clutch for one particular speed of the shaft 14 may be controlled by varying the spacing between the permanent field magnet 34 and the armature. This is schematically indicated by the screw 52 on which the magnet 34 is carried by a nut 54, the spacing being adjusted by rotation of the screw 52. It will be understood that while I have shown only a single field magnet 34, a number of such magnets may be provided if desired, the said magnets being distributed about the armature, and preferably being mounted for simultaneous adjustment toward or away from the armature.

Fig. 4 illustrates a clutch which is modified in two respects relative to that shown in Fig. 1. The magnetic clutch itself may be the same, it comprising schematically a driving shaft 60 carrying a driving part 62 and a driven shaft 64 carrying a driven part 66, the driving part 62 having a magtnizing coil 68. The driving part 62 is provided with magnet poles 70, 71, 72, 73, 74, 75, 76, 77 (Fig. 5), each of which has a coil wound thereabout. The essential difference is the use of localized coils around each pole, instead of a snake winding extending around all of the poles. The coils are suitably wired together, either in series, or in shunt, or partially in series and partially in shunt, depending on the voltage and current desired for energizing the magnetizing coil 68. The connections for this purpose are not shown.

The arrangement of Fig. 4 also differs from Fig. 1 in showing the use of an electro-magnet 78 having a field coil 80 instead of a permanent magnet. Coil 80 is energized from an external source, such as the battery indicated at 82 in Fig. 6, and in such case the intensity of the field may be varied, as by using a variable resistor indicated at 84. It may be mentioned that in the usual magnetic clutch, anrd particularly in the magnetic fluid clutch, the magnetizing coil 68 requires very little power compared to the load being transmitted by the clutch, and in the present form of the invention the field coil 80 requires for its excitation only a small fraction of the power generated and delivered to the magnetizing coil 68, so that the power needed from the external source 82 is very small indeed.

It will be understood that while I have shown only a single field coil, a number of field coils may be provided, distributed in any desired fashion about the armature, and in ultimate form making up a complete field winding. Similarly the number of armature poles may be varied, and may be greater than the number here shown.

As so far described the clutch magnetizing coil is energized by alternating current. In many cases it is preferred to energize the same with direct current, particularly in order to eliminate the need for laminating the magnetic iron. A simple rectifier can be used for this purpose. The rectifier may be of the dry disc copper oxide type, or of the selenium type. Such an arrangement is schematically illustrated in Fig. 7, in which it will be seen that, as before, there is a driving shaft 90, a driving clutch part 92, a driven clutch part 94, a driven shaft 96, and a magnetizing coil 98. The driving clutch part 92 carries a series of armature poles 100, which may have individual windings as described in connection with Figs. 4 and 5, or a single snake winding as described in connection with Figs. 1 and 2. A field magnet is schematically indicated at 102, and this may be either a permanent magnet or an electro-magnet, adjustable in either method previously described, and duplicated to provide any desired number of field magnets. The present clutch differs from those previously described in being provided with a dry disc rectifier 104 connected between the armature winding and the clutch magnetizing coil. As is well known by those skilled in the art, several such rectifiers may be arranged in bridge formation to provide full-wave rectification instead of half-wave rectification of the alternating current generated by the armature. Filter condensers can be shunted across the coil 98 to smooth the current and improve the rectifier efficiency.

Fig. 8 illustrates still another modification of the invention, and shows how the clutch may be given a special characteristic, as for example a desired starting characteristic. As before, the clutch is schematically shown to comprise a driving shaft 110, a driving clutch part 112, a driven clutch part 114, a driven shaft 116, and a magnetizing coil 118. The driving clutch part 112 carries a series of armature poles 120 which may be provided with individual windings as described in connection with Figs. 4 and 5, or may be provided with a continuous snake winding as described in connection with Figs. 1 and 2. The armature rotates relative to a field magnet 122. As before, the magnet 122 symbolizes one of a ring of magnets, which may be either permanent magnets or electromagnets, and which may be adjustable, all as previously described. As before the armature is connected to the magnetizing coil 118, but in the present case a special resistor 124 is disposed in the circuit. This resistor has a high temperature co-efficient of resistivity, thus making the energization of the magnetizing coil non-linear in respect to the speed of the driving shaft 110. Without the resistor 124 the torque capable of being transmitted by the clutch increases with the driving speed. In starting, or with the driving shaft 110 turning at slow speed, the torque which the clutch is capable of transmitting is a minimum. For many purposes this is desirable. If, however, it is desired to relatively increase the torque transmitted at slow speed, the resistor 124 may be provided, and is so selected that at high speed it heats up, thereby increasing the resistance of the circuit and reducing the energization of the magnetizing coil 118. At low speed the current supplied to the magnetizing coil is low and the resistor 124 is not heated. Thus the resistance of the circuit is kept low, and the energization of the magnetizing coil 118 at low speed is made greater than it otherwise would be relative to the energization of the magnetizing coil 118 at high speed. In this way the clutch is given a high starting torque characteristic relative to a specified or predetermined full speed driving torque.

In the foregoing discussion it will be understood that a resistor having a non-linear current characteristic may be employed, in which the change in resistance is a function of the current without that change necessarily resulting from a change in temperature. It will also be understood that the modification of the characteristic may be made in the negative sense if desired, that is to say, a resistor may be employed having a negative temperature co-efficient or a negative current characteristic, the net effect being that the resistor has a high resistance when carrying a small current and has a low resistance when carrying a large current. One commercial device of this character is sold under the trade name "Thermister." The use of such a negative or reverse effect gives a delayed or more gentle start, and is therefore useful for automobiles, as an example, in which it is desired that the clutch remain as nearly de-energized as possible when the engine is idling, and in which a very gradual start is desired.

In Fig. 8 it will be noted that I have shown an inductor 126, and a capacitor 128, as well as the resistor 124. By using a reactive element special characteristics may be obtained for special purposes. With a reactor the impedance is a function of frequency. Consequently, as the speed rises the accompanying rise in frequency may be used to offset the rise in voltage which would otherwise occur. Thus the excitation of the clutch may be made to remain substantially constant throughout a range of speed. This would employ the inductor 126 alone in series with coil 118 (or a capacitor in shunt with coil 118). Moreover, by using both inductance and capacitance the circuit may be tuned or made resonant to a particular frequency, so that at that particular frequency the magnetization of the clutch may be made either a maximum or a minimum, depending on whether the resonant circuit is series resonant or parallel resonant if arranged in series with the magnetizing coil 118, as shown, or vice versa if arranged in shunt to the magnetizing coil. In this way the torque transmitted by the clutch may be made either a maximum or a minimum at a particular speed value. Fig. 8 schematically symbolizes the use of resistance or inductance or capacitance or any desired combination of the same.

Fig. 9 of the drawing illustrates another modification of the invention which gives the clutch a very different characteristic. In the present case the clutch is given a characteristic much like that of an ordinary fluid coupling or so-called "fluid drive." It has the advantage of good shock absorption. The modifications previously described have the advantage of affording a positive lock between the driving and driven parts of the clutch, whereas in the present case there must always be at least some slippage, just as in the case of a fluid drive of the turbine type. Referring to the drawing, the clutch as before is schematically shown to comprise a first shaft 130, a first clutch part 132, a second clutch part 134, a second shaft 136, and a magnetizing coil 138. In the present form of the invention either shaft may be the driving shaft, and the other the driven shaft. The clutch part 132 which carries the magnetizing coil 138 is provided with a series of armature poles 140 having appropriate armature windings. These may be individual windings as in Figs. 4 and 5, or a snake winding as in Figs. 1 and 2. The armature winding is connected to the magnetizing coil 138. The armature is rotated relative to a field magnet 142. In the present case, however, the field magnet 142, instead of being as before stationary, is mounted on the second clutch part 134, as is here indicated by the mounting post 144 at the base of the magnet 142. In other words, it is rotatable instead of non-rotatable. The magnet is preferably a permanent magnet. A series of such magnets may be disposed about the clutch part 134, but for simplicity only one is shown in the present drawing. It will be understood that on starting the magnetic clutch is in unmagnetized, and therefore is in uncoupled condition. If shaft 130 is the driving shaft and is rotated, the driven shaft 136 remains stationary, and the armature is rotated relative to the stationary field magnet. If shaft 136 is the driving shaft and is started up, the field magnet is rotated relative to the armature. In either case a potential is generated, causing a current flow which energizes the magnetizing coil 138. This increases the locking torque, and the clutch takes hold. Thereafter any increase in load will cause an increase in slippage and consequently an increase in the torque transmitted by the clutch, thus cushioning but accommodating the increased load. If desired, the rectifier described in connection with Fig. 7 may be employed for D. C. operation, this being schematically indicated at 139. A non-linear or a negative current characteristic resistor, indicated at 141, may be used to modify the clutch characteristic. Either or both are optional.

For certain purposes it may be desirable to combine the characteristics of the clutches as so far described, that is, the rising torque characteristic obtained with a non-rotating generator field, and the slippage and cushioning effect obtained with a rotating generator field. Such a clutch is schematically shown in Fig. 10, in which the shafts and clutch parts are the same as in Fig. 9 and preceding figures, except that the magnetizing coil of the clutch may consist of two parts 145 and 146. The first winding 145 is energized from a generator consisting of an armature 147 excited by a non-rotating field 148, as in Figs. 1–8, while the second winding 146 is energized from an armature 149 excited by a rotating field 151 as in Fig. 9. If desired, a single magnetizing winding may be used, but in that case greater care will have to be exercised in relating to each other the voltages produced by the generator 147, 148 and the generator 149, 151. The arrangement shown in Fig. 10 results in a rising torque, but with slippage upon fluctuation in load, thereby giving the clutch a stable characteristic. If desired, the characteristic may be further modified by the use of a suitable impedance, shown generally at 153. This may consist of a resistor having a negative or a positive current characteristic, or/and an inductor or/and a capacitor, singly or in desired combination. The same applies to impedance 155, all as in Fig. 8. The showing of Fig. 10 omits details because the added feature is the combination of the two kinds of energization in a single clutch, one using a non-rotating field and the other using a rotating field. It will therefore be understood that the showing of the non-rotatable field at 148 is purposely schematic and generalized, because the field may be like any of those previously described.

As so far described the armature of the generator has in all cases been mounted directly on the clutch. This is not essential, and if desired the generator may be a separate unit having an armature carried on the driving shaft of the clutch, but not forming an actual part of the clutch unit per se. This is schematically illustrated in Figs. 11 and 12. Referring first to Fig. 11 the clutch is again schematically illustrated as comprising a driving shaft 150, a driving part 152, a driven part 154, a driven shaft 156, and a magnetizing coil 158. The magnetizing coil is energized by a generator having an armature 160 mounted on shaft 150. The connection between the armature and the magnetizing coil is indicated by exposed conductors 162, but it will be understood that in practice these conductors may be passed along or through the shaft portion 164. The field of the generator is made up of a suitable number of permanent magnets 166 disposed about the armature. If desired the field may be mounted for adjustment relative to the armature, as for example by means of a screw 168 rotatable in a nut 170 carrying the field magnets.

Referring now to Fig. 12, this arrangement is similar to that shown in Fig. 11, except that the field of the generator consists of a field winding or field coils 172 energized from a suitable source such as a battery 174. The field excitation may be controlled in any desired manner, as for example by means of the variable resistance 176.

In all cases the additions previously described may be used. Thus in Fig. 11 a rectifier is shown at 159, and in Fig. 12 an impedance is shown at 178. The latter may be used in Fig. 11, and the former may be used in Fig. 12. The impedance may be selected and adjusted in the ways already described in Fig. 8. Moreover, Fig. 11 also shows that a rectifier and a resistor may be combined, as shown at 159, 161, with a positive or a negative current characteristic.

One distinction between the arrangements of Figs. 11 and 12 with their separated generator, and the arrangements of Figs. 1 through 10, may be better understood if it is kept in mind that the showing of the clutch in these drawings is simplified and schematic, and that in practice it is common to provide a stationary housing around the clutch parts. In Figs. 11 and 12 the generator would be disposed outside such a housing, whereas in Figs. 1 through 10 the generator would be disposed inside the housing. There is a simplification in the overall structure required in the latter case.

It will be understood by those skilled in the art that all of the foregoing description in respect to clutches is applicable also to magnetic brakes or absorption dynamometers. From one viewpoint it may be said that a magnetic brake is simply a magnetic clutch in which one of the two main clutch parts is stationary. When the clutch or brake is magnetized the stationary part "clutches" and tends to hold back the rotating part. The foregoing description is applicable to such stationary clutches, although the relative emphasis of the advantages may shift. For example, in the case of brakes the objection to slip rings need not arise. On the other hand, the advantage of wholly eliminating or minimizing the use of external power is enhanced, for the device is acting any way to absorb and dissipate power, and it is an advantage to dissipate some of that power in the generator, instead of wasting purchased power from an outside source. It is believed that the method of constructing and using my self-excited magnetic clutch, as well as the advantages thereof, will be apparent from the foregoing detailed description. It will also be apparent that while I have shown and described the invention in several preferred forms, changes may be made in the structures shown, without departing from the scope of the invention, as sought to be defined in the following claims.

In the claims the term "clutch" is used generically for a structure in which both of the clutch parts are mounted on shafts for rotation, or in which only one of the clutch parts is mounted on a shaft for rotation, the claims then being applicable to magnetic brakes as a special form of magnetic clutch. The rotating part is then a driving part, and the stationary part is a driven part which is so heavily loaded that it cannot be turned.

I claim:

1. A self-excited magnetic clutch comprising a driving part carrying magnetizing windings for magnetizing the clutch, a driven part, a first generator armature connected to said driving part for rotation therewith, conductors connecting said armature to a part of said magnetizing windings, a non-rotating generator field magnet relative to which said armature is rotated, a second generator armature connected to said driving part for rotation therewith, conductors connecting said second armature to a part of said magnetizing windings, and a second generator field magnet relative to which the second armature is rotated, said second field magnet being rotated by the driven part of the clutch.

2. A self-excited magnetic fluid clutch comprising magnetic fluid, a driving part carrying magnetizing windings for magnetizing the magnetic fluid, a driven part, a first generator armature on said driving part for rotation therewith, conductors connecting said armature to a part of said magnetizing windings, a non-rotating generator field magnet relative to which said armature is rotated whereby the magnetization is a function of the speed of rotation of said driving part, a second generator armature on said driving part for rotation therewith, conductors connecting said second armature to a part of said magnetizing windings, a second generator field magnet relative to which the second armature is rotated, said second field magnet being rotated by the driven part of the clutch whereby the magnetization is a function of the slippage or relative speed of the two parts of the clutch, said clutch combining the characteristics of rising torque and shock load slippage.

3. A self-excited magnetic clutch comprising a driving part carrying a magnetizing coil for magnetizing the clutch, a driven part, a generator armature on said driving part for rotation therewith, conductors connecting said armature to said magnetizing coil, said conductors including a combination of inductor and capacitor properly related to one another for resonance at a desired frequency, in order to vary the torque as a function of speed and to thereby give the clutch special characteristics, and a generator field magnet relative to which the armature is rotated, whereby as the speed reaches that corresponding to resonance the impedance of the circuit changes markedly, which in turn markedly modifies the operation of the clutch at that speed.

4. A self-excited magnetic clutch comprising a first part carrying a magnetizing coil for magnetizing the clutch, a second part, a generator armature on said first part for rotation therewith, conductors connecting said armature to said magnetizing coil, said conductors including a combination of inductor and capacitor properly related to one another for resonance at a desired frequency, whereby as the speed reaches that corresponding to resonance the impedance of the circuit changes markedly, which in turn markedly modifies the operation of the clutch at that speed, in order to vary the torque as a function of speed and to thereby give the clutch special characteristics, and a generator field magnet relative to which the armature is rotated, said field magnet being mounted on the second part of the clutch, whereby the magnetization is also a function of the slippage or relative speed of the two parts of the clutch.

5. A self-excited magnetic clutch comprising a driving part carrying a magnetizing coil for magnetizing the magnetic structure of the clutch, a driven part, a generator armature connected to said driving part for rotation therewith, a discrete lumped resistor connected between the armature and the magnetizing coil, said resistor being a non-linear resistor whose resistance value varies with the current flowing through the said resistor, and a generator field magnet relative to which the armature is rotated, whereby a change in speed changes the magnitude of the generated magnetizing current and so changes the resistance of the resistor which in turn modifies the effect produced on the clutch by the magnetizing current.

6. A self-excited magnetic clutch comprising a driving part carrying a magnetizing coil for magnetizing the magnetic structure of the clutch, a driven part, a generator armature on said driving part for rotation therewith, a discrete lumped reactor connected between said armature and said magnetizing coil, and a generator field magnet relative to which the armature is rotated in order to generate an alternating current, whereby a change in speed changes the frequency of the generated magnetizing current and so changes the impedance of the reactor which in turn modifies the effect produced on the clutch by the magnetizing current.

7. A self-excited magnetic clutch comprising a driving part carrying a magnetizing coil for magnetizing the magnetic structure of the clutch, a driven part, a generator armature on said driving part for rotation therewith, a discrete lumped inductor connected between said armature and said magnetizing coil, and a generator field magnet relative to which the armature is rotated in order to generate an alternating current, whereby an increase in speed increases the frequency of the generated magnetizing current and so increases the impedance of the inductor which in turn modifies the effect produced on the clutch by the magnetizing current.

8. A self-excited magnetic clutch comprising a first part carrying a magnetizing coil for magnetizing the magnetic structure of the clutch, a second part, a generator armature on said first part for rotation therewith, a discrete lumped resistor connected between said armature and said magnetizing coil, said resistor being a non-linear resistor whose resistance value is a function of the current flowing through the said resistor, whereby a change in speed changes the magnitude of the generated magnetizing current and so changes the resistance of the resistor which in turn modifies the effect produced on the clutch by the magnetizing current, and a generator field magnet relative to which the armature is rotated, said field magnet being mounted on the second part of the clutch, whereby the magnetization is also a function of the slippage or relative speed of the two parts of the clutch.

9. A self-excited magnetic clutch comprising a first part carrying a magnetizing coil for magnetizing the magnetic structure of the clutch, a second part, a generator armature on said first part for rotation therewith in order to generate an alternating current, a discrete lumped reactor connected between said armature and said magnetizing coil, whereby a change in speed changes the frequency of the generated magnetizing current and so changes the impedance of the reactor which in turn modifies the effect produced on the clutch by the magnetizing current, and a generator field magnet relative to which the armature is rotated, said field magnet being mounted on the second part of the clutch, whereby the magnetization is also a function of the slippage or relative speed of the two parts of the clutch.

10. A self-excited magnetic clutch comprising a first part carrying a magnetizing coil for magnetizing the magnetic structure of the clutch, a second part, a generator armature on said first part for rotation therewith in order to generate an alternating current, a discrete lumped inductor connected between said armature and said magnetizing coil, whereby an increase in speed increases the frequency of the generated magnetizing current and so increases the impedance of the inductor which in turn modifies the effect produced on the clutch by the magnetizing curretn, and a generator field magnet relative to which the armature is rotated, said field magnet being mounted on the second part of the clutch, whereby the magnetization is also a function of the slippage or relative speed of the two parts of the clutch.

References Cited in the file of this patent

UNITED STATES PATENTS

| | | |
|---|---|---|
| 704,574 | Pentsche | July 15, 1902 |
| 1,963,642 | Beauchamp | June 19, 1934 |
| 1,995,605 | Downing | Mar. 26, 1935 |
| 2,214,901 | Griffin | Sept. 17, 1940 |
| 2,271,087 | Maier | Jan. 27, 1942 |
| 2,352,620 | Edwards | July 4, 1944 |
| 2,395,772 | Winther | Feb. 26, 1946 |
| 2,449,779 | Jaeschke | Sept. 21, 1948 |
| 2,479,989 | Winther | Aug. 23, 1949 |
| 2,490,789 | Ellis | Dec. 13, 1949 |
| 2,718,157 | Schaub | Sept. 20, 1955 |

FOREIGN PATENTS

| | | |
|---|---|---|
| 740,968 | France | Feb. 3, 1933 |
| 544,941 | Great Britain | May 4, 1942 |

OTHER REFERENCES

Publications—Technical Report 1213, National Bureau of Standards, Wash., D. C. (Copy in U. S. Patent Office received March 30, 1948.)